United States Patent
Tzannes et al.

(10) Patent No.: US 8,718,118 B2
(45) Date of Patent: May 6, 2014

(54) PACKET DETECTOR

(75) Inventors: Marcos Tzannes, Orinda, CA (US);
Joon Bae Kim, Lexington, MA (US);
Stuart Sandberg, Arlington, MA (US)

(73) Assignee: Aware, Inc., Bedford, MA (US)

( * ) Notice: Subject to any disclaimer, the term of this patent is extended or adjusted under 35 U.S.C. 154(b) by 1 day.

(21) Appl. No.: 13/376,400

(22) PCT Filed: Jul. 22, 2010

(86) PCT No.: PCT/US2010/042850
§ 371 (c)(1),
(2), (4) Date: Mar. 27, 2012

(87) PCT Pub. No.: WO2011/011572
PCT Pub. Date: Jan. 27, 2011

(65) Prior Publication Data
US 2012/0275528 A1    Nov. 1, 2012

Related U.S. Application Data

(60) Provisional application No. 61/227,673, filed on Jul. 22, 2009.

(51) Int. Cl.
*H04B 1/00* (2006.01)

(52) U.S. Cl.
USPC ........... 375/141; 375/260; 375/354; 370/465; 370/509

(58) Field of Classification Search
USPC ......... 375/140, 141, 145, 146, 260, 267, 295, 375/299, 354, 359; 370/203, 319–321, 324, 370/349, 464–467, 471, 474, 476, 509, 510, 370/512
See application file for complete search history.

(56) References Cited

U.S. PATENT DOCUMENTS

2009/0086832 A1    4/2009    Tarokh et al.
2009/0122987 A1*   5/2009    Mo et al. ................. 380/277

(Continued)

FOREIGN PATENT DOCUMENTS

CN       1757212      4/2006
CN     101120563      2/2008

(Continued)

OTHER PUBLICATIONS

"IEEE Standard 802.11A Part 11: Wireless LAN Medium Access Control (MAC) and Physical Layer (PHY) Specifications" IEEE STD 802.11A-1999, Sep. 16, 1999, pp. 1-82, XP002245649.

(Continued)

*Primary Examiner* — Dac Ha
(74) *Attorney, Agent, or Firm* — Jason H. Vick; Sheridan Ross, PC

(57) ABSTRACT

There are several exemplary ways to more efficiently communicate an out-of-domain seed to a receiver—in a first technique, the seed can be indicated in the header portion or data portion of a packet. For example, the header portion of the packet could contain one or more bit fields that indicate the value of the LFSR seed used for the preamble portion of the packet. The receiver would learn the out-of-domain seed after receiving a first out-of-domain packet and decoding the header portion of that packet. After learning the out-of-domain seed, the receiver could send a packet indicating the value of the out-of-domain seed to the local master. The local master could then transmit the value of the out-of-domain seed in the header portion or data portion of a local MAP frame.

16 Claims, 9 Drawing Sheets

(56) References Cited

U.S. PATENT DOCUMENTS

2010/0255780 A1* 10/2010 Rajagopal et al. ........... 455/41.2
2010/0265922 A1* 10/2010 Bracha ......................... 370/336
2013/0156128 A1* 6/2013 Watanabe ..................... 375/295

FOREIGN PATENT DOCUMENTS

| CN | 101399806 | 4/2009 |
|----|-----------|--------|
| EP | 0982892 | 3/2000 |
| WO | WO 2006/068543 | 6/2004 |
| WO | WO 2004/080020 | 9/2004 |
| WO | WO 2004/082184 | 9/2004 |
| WO | WO 2006/022802 | 3/2006 |

OTHER PUBLICATIONS

"IEEE 802.11: Wireless LAN Medium Access Controm (MAC) and Physical Layer (PHY) Specifications" Jun. 2007; 1233 pages.

"IEEE 802.3: Carrier Sense Multiple Access with Collision Detection (CSMA/CD) Access Method and Physical Layer Specifications" Dec. 2008; 2977 pages.

"IEEE 802.16: Air Interface for Fixed Broadband Wireless Access Systems" Oct. 2004; 895 pages.

"ITU G.9960: Unified High-Speed Wire-Line Based Home Networking Transceivers—Foundation" Oct. 2009; 112 pages.

"ITU Standard G.997.1: Physical Layer Management for Digital Subscriber Line (DSL) Transceivers" Apr. 2009; 128 pages.

"ITU G.hn: Supporting Multiple Reference Sequences to Modulate the Preamble" Jun. 2009; 4 pages.

International Search Report for International (PCT) Application No. PCT/US2010/042850, mailed Oct. 20, 2010.

Written Opinion for International (PCT) Application No. PCT/US2010/042850, mailed Oct. 20, 2010.

International Preliminary Report on Patentability for International (PCT) Application No. PCT/US2010/042850, mailed Feb. 2, 2012.

Communication Pursuant to Rules 161(1) and 162 EPC for European App No. 10740791.8 mailed Feb. 29, 2012.

Official Action (including translation) for Chinese Patent Application No. 201080033468.0, mailed Dec. 6, 2013.

* cited by examiner

PACKET DETECTOR

RELATED APPLICATION DATA

This application is a national stage application under 35 U.S.C. 371 of PCT Application No. PCT/US2010/042850 having an international filing date of Jul. 22, 2010, which designated the United States, which PCT application claims the benefit of and priority under 35 U.S.C. §119(e) to U.S. Patent Application No. 61/227,673, filed Jul. 22, 2009, entitled "Method, System, Means, Computer-Readable Media and Protocol for Improved Packet Detector," each of which are incorporated herein by reference in their entirety.

FIELD OF THE INVENTION

An exemplary aspect of this invention relates to communications systems. More specifically, exemplary methods, systems, means, protocols and computer-readable storage media, are directed toward an improved packet detector.

BACKGROUND

Conventional multi-user communication systems use frame-based (or packet-based) transmission to communicate between two or more users over a shared channel based on OFDM. Examples of such systems include IEEE 802.11x (Wireless LAN), IEEE 802.16 (WiMAX) and ITU G.9960 (G.hn). These systems use OFDM transmission (also referred to sometimes as Discrete MultiTone (DMT)) which divides the transmission frequency band into multiple sub-carriers (also referred to as tones or sub-channels), with each sub-carrier individually modulating a bit or a collection of bits.

Conventional methods of packet detection use a predefined preamble as specified, for example, in the standards above. The G.hn standard uses predefined OFDM symbols modulated with an all ones bit as specified in Section 7.1.4.5.2.1.1 of G.hn and rotated with the Constellation Scrambler in Section 7.1.4.3.3 of G.hn. For convenience, the text contained in Sections 7.1.4.5.2.1.1 and 7.1.4.3.3 of G.hn is contained in Appendix A. A method for supporting multiple reference sequences to modulate the preamble is ITU Contribution 09BM-038 (contained in Appendix B). 09 MB-038 proposes to allow different reference sequences to modulate the preamble subcarriers. The different sequences may be defined by a properly chosen set of seeds that initialize the already specified LFSR generator. This LFSR (Linear Feedback Shift Register) generator provides the pseudo-random di-bit sequence that modulates the non-masked preamble sub-carriers. Allowing the use of different reference sequences among different networks can serve as another mechanism for mitigating disturbances from neighboring networks in PLC environments.

SUMMARY

However, our analysis shows that methods that use a threshold-based cross-correlation approach to detect packets (as proposed in 09BM-038) can result in at least (up to) 3 dB of performance loss.

Therefore, a first exemplary aspect is at least directed toward methods, systems, means, protocols and computer-readable storage media and associated program(s) for an improved packet detector.

The analysis further shows that the performance loss of conventional methods can be overcome by using receiver algorithms that use knowledge of the seed of the constellation scrambler LFSR used by the out-of-domain (e.g., neighboring network) transmitter. In an exemplary embodiment, the receiver compares detection results using a local (or domain) LFSR seed and an out-of-domain LFSR seed. Based on these detection results a packet is declared as "detected" or "not detected." For example, a first cross-correlation can be performed using a received signal with a first predefined signal generated using a first LFSR seed (e.g., for in-domain packets). A second cross-correlation can be performed using the received signal with a second predefined signal generated using a second LFSR seed (e.g., for out-of-domain packets). A comparison can be made between the first and second cross-correlation to determine if the packet is an in-domain (local) packet or from the other network. This method can be extended to any number of networks. For example, if there are n networks, there n cross-correlations could be determined. A comparison could be made between the n cross-correlations to determine if the packet is an in-domain (local) packet or from one of the n other networks.

There are several exemplary ways to communicate the out-of-domain seed to the receiver.

In accordance with a first an exemplary embodiment, the seed can be indicated in the header portion or data portion of a packet. For example, the header portion of the packet could contain one or more bit fields that contain information that can be used to determine the value of the LFSR seed used for the preamble portion of the packet. The receiver would learn the out-of-domain seed after receiving a first out-of-domain packet and decoding the header portion of that packet. After learning the out-of-domain seed, the receiver could send a packet indicating the value of the out-of-domain seed to the local master. The local master could then transmit the value of the out-of-domain seed in the header portion or data portion of a local MAP frame (as described in the exemplary embodiment below) to other transceivers in the local domain.

Alternatively, or in addition, the seed can be indicated in the header portion or data portion of an out-of-domain MAP frame. The receiver would learn the out-of-domain seed after receiving an out-of-domain MAP frame. For example, the header portion and/or data portion of the out-of-domain MAP frame could contain one or more bit fields that contain information that can be used to determine the value of the LFSR seed used for the preamble portion of the packets sent in the neighboring (out-of-domain) network. The receiver would learn the out-of-domain seed after receiving a out-of-domain MAP frame and decoding the header portion and/or data portion of the MAP frame.

Alternatively, or in addition, one or more out-of-domain seeds can be indicated in the header portion or data portion of the local MAP frame. For example, the header portion of the MAP frame could contain one or more bit fields that contain information that can be used to determine the value of the one or more out-of-domain LFSR seeds used for the preamble portion of packets from one or more other (neighbor) domains.

Alternatively, or in addition, a receiver may receive a plurality of out-of-domain packet(s) in order to determine the LFSR seed used for the preamble portion of the packets. For example, the receiver may process the out-of-domain packet(s) using a plurality of seeds to determine the seed that is being used by the other domain. This may be done, for example, during a diagnostic mode in which other transmitters in the local network are silent. After learning the out-of-domain seed, the receiver could send a packet indicating the value of the out-of-domain seed to the local master. The local master could then transmit the value of the out-of-domain seed in the header portion or data portion of a local MAP frame (as described in the embodiment above).

Exemplary Receiver Detection Technique

The preamble transmitted in a given network contains several consecutive repetitions of the same subblock. The subblock is LFSR-modulated based on that particular network's seed.

Let $x_m^n$, m=0, ..., M−1, denote the sequence of transmitted samples for network n's subblock.

For the first step in the detection process, the receiver continuously determines the autocorrelation between consecutive received subblocks of the reception, until observing several consecutive high correlations. The correlation for the kth subblock is determined as $$a_k = \sum_{m=0}^{M-1} r_m^{k-1} r_m^k$$

where:

$r_m^k$ is the mth sample of the kth received subblock. Upon observing large $|a_k|$ for several consecutive k, the receiver can declare a preliminary detection.

Due to the periodic nature of the preamble, a preliminary detection can occur for a preamble transmitted from the local network, or a neighbor network. The second step in the detection process is to determine if the initial detection is of a preamble in the local network. Toward this determination, for a given k with large $|a_k|$, the receiver determines the cross-correlation functions:

$$\rho_i^{k,n} = \sum_{m=0}^{M-1} x_{m+i}^n r_m^k$$

where m+i is modulo M.

If the received preamble is from network n, a sequence $\rho_i^{k,n}$, i=0, ..., M−1 is an estimate for the channel impulse, and will tend to have much of its energy concentrated in a small number of samples i. However, if the received preamble is not from network n, the sequences $\rho_i^{k,n}$ will have less concentration in their energy.

The cross-correlation function results $\rho_i^{k,n}$ are compared and/or processed and used to determine whether the packet was from the local network or a neighbor network. For example, from $\rho_i^{k,n}$, the receiver calculates $v^{k,n}$ the ratio of the energy in the j largest magnitudes in $\rho_i^{k,n}$, i=0, ..., M−1, divided by the total energy. The network n for which the mean of $v^{k,n}$, over k, is maximum is determined to be the network from which the preamble has been transmitted. If this network n is the local network, processing for demodulating the remainder of the packet is initiated; otherwise the detection process begins again.

Exemplary aspects of the invention are directed toward a method of OFDM communication including:

transmitting, by a transmitter, a packet comprising a header portion and preamble portion, wherein the preamble portion comprises a plurality of OFDM symbols modulated using a constellation scrambler, wherein the constellation scrambler comprises an LFSR generator that is initialized with a seed, and wherein the header portion of the packet contains one or more bit fields that contain information that can be used to determine the value of the seed used for the preamble portion of the packet.

Exemplary aspects of the invention are also directed toward a method of OFDM communication including:

receiving, by a receiver, a packet comprising a header portion and preamble portion, wherein the preamble portion comprises a plurality of OFDM symbols modulated using a constellation scrambler, wherein the constellation scrambler comprises an LFSR generator that is initialized with a seed, and wherein the header portion of the packet contains one or more bit fields that contain information that can be used to determine the value of the seed used for the preamble portion of the packet.

Exemplary aspects of the invention are also directed toward means for OFDM communication including:

means for transmitting, by a transmitter, a packet comprising a header portion and preamble portion, wherein the preamble portion comprises a plurality of OFDM symbols modulated using a constellation scrambler, wherein the constellation scrambler comprises an LFSR generator that is initialized with a seed, and wherein the header portion of the packet contains one or more bit fields that contain information that can be used to determine the value of the seed used for the preamble portion of the packet.

Exemplary aspects of the invention are also directed toward means for OFDM communication including:

receiving, by a receiver, a packet comprising a header portion and preamble portion, wherein the preamble portion comprises a plurality of OFDM symbols modulated using a constellation scrambler, wherein the constellation scrambler comprises an LFSR generator that is initialized with a seed, and wherein the header portion of the packet contains one or more bit fields that contain information that can be used to determine the value of the seed used for the preamble portion of the packet.

Exemplary aspects of the invention are also directed toward an OFDM communication system including:

a transmitter capable of transmitting a packet comprising a header portion and preamble portion, wherein the preamble portion comprises a plurality of OFDM symbols modulated using a constellation scrambler, wherein the constellation scrambler comprises an LFSR generator that is initialized with a seed, and wherein the header portion of the packet contains one or more bit fields that contain information that can be used to determine the value of the seed used for the preamble portion of the packet.

Exemplary aspects of the invention are also directed toward an OFDM communication system including:

a receiver capable of receiving a packet comprising a header portion and preamble portion, wherein the preamble portion comprises a plurality of OFDM symbols modulated using a constellation scrambler, wherein the constellation scrambler comprises an LFSR generator that is initialized with a seed, and wherein the header portion of the packet contains one or more bit fields that contain information that can be used to determine the value of the seed used for the preamble portion of the packet.

Exemplary aspects of the invention are also directed toward a non-transitory computer-readable media having stored thereon instructions that, if executed by a processor, perform OFDM communication including:

instructions that generate a packet for transmission, the packet comprising a header portion and preamble portion, wherein the preamble portion comprises a plurality of OFDM symbols modulated using a constellation scrambler, wherein the constellation scrambler comprises an LFSR generator that is initialized with a seed, and wherein the header portion of the packet contains one or more bit fields that contain information that can be used to determine the value of the seed used for the preamble portion of the packet.

Exemplary aspects of the invention are also directed toward a non-transitory computer-readable media having stored thereon instructions that, if executed by a processor, perform OFDM communication including:

instructions that process a packet after reception, the packet comprising a header portion and preamble portion, wherein the preamble portion comprises a plurality of OFDM symbols modulated using a constellation scrambler, wherein the constellation scrambler comprises an LFSR generator that is initialized with a seed, and wherein the header portion of the packet contains one or more bit fields that contain information that can be used to determine the value of the seed used for the preamble portion of the packet.

Exemplary aspects of the invention are also directed toward a method of OFDM communication including detecting a packet by performing at least two cross-correlation functions using at least two different LFSR seeds and comparing the results of the at least two cross-correlation functions.

Any of the above aspects and further aspects may be located in a network management system or network operation device that is located inside or outside the network and/or the transceiver(s). In particular, aspects that are related to seed(s) in a packet may be done in such a device. The network operation or management device that is located inside or outside the network may be managed and/or operated by a user, consumer, service provider or power utility provider or a governmental entity.

These and other features and advantages of this invention are described in, or are apparent from, the following detailed description of the exemplary embodiments.

BRIEF DESCRIPTION OF THE DRAWINGS

The exemplary embodiments of the invention will be described in detail, with reference to the following figures, wherein.

DETAILED DESCRIPTION

Figure 1:
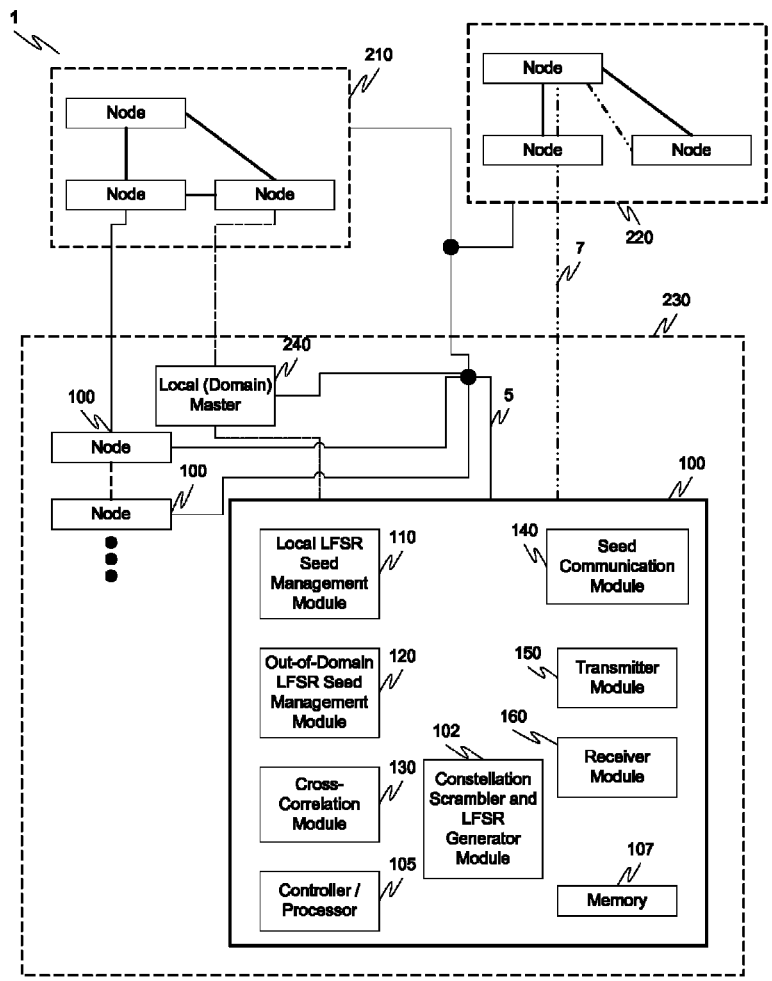
FIG. 1 illustrates an exemplary communications environment.

The exemplary embodiments of this invention will be described in relation to communications systems, as well as protocols, techniques and methods for improved packet detection, such as a DSL or multimode multicarrier communications environment, a home network or an access network, or in general any communications network operating using any communications protocol(s). Examples of such home or access networks include home powerline networks, access powerline networks, home coaxial cable network, access coaxial cable network, wireless home networks, wireless corporate networks, home telephone networks and access telephone networks. However, it should be appreciated that in general, the systems, methods, and techniques of this invention will work equally well for other types of communications environments, networks, and/or protocols.

The exemplary systems and methods of this invention will also be described in relation to wired or wireless modems and/or a software and/or a hardware testing module, a telecommunications test device, or the like, such as a DSL modem, an ADSL modem, and xDSL modem, a VDSL modem, a line card, a G.hn transceiver, a MOCA transceiver, a Homeplug® transceiver, a power line modem, a wired or wireless modem, test equipment, a multicarrier transceiver, a wireless wide/local area network system, a satellite communications system, a network-based communications systems, such as an IP, Ethernet or ATM system, a modem equipped with diagnostic capabilities, or the like, or a separate programmed general purpose computer having a communications device that is capable of operating in conjunction with any one or more of the following communications protocols: MOCA, G.hn, Homeplug, IEEE 802.11, IEEE 802.3 or the like. However, to avoid unnecessarily obscuring the present invention, the following description omits well-known structures, operations and devices that may be shown in block diagram form or are otherwise summarized or known.

For purposes of explanation, numerous details are set forth in order to provide a thorough understanding of the present invention. It should be appreciated however that the present invention may be practiced in a variety of ways beyond the specific details set forth herein. Furthermore, while the exemplary embodiments illustrated herein show various components of this system collocated, it is to be appreciated that the various components of the system can be located at distant portions of a distributed network, such as a communications network, node, within a Domain Master, and/or the internet, or within a dedicated secured, unsecured, and/or encrypted system and/or within a network operation or management device that is located inside or outside the network. As an example, a Domain Master can also be used to refer to any device, system or module that manages and/or configures any one or more aspects of the network or communications environment.

Thus, it should be appreciated that the components of the system can be combined into one or more devices, or split between devices, such as a modem, a station, a Domain Master, a network operation or management device, a node or collocated on a particular node of a distributed network, such as a communications network. As will be appreciated from the following description, and for reasons of computational efficiency, the components of the system can be arranged at any location within a distributed network without affecting the operation thereof. For example, the various components can be located in a Domain Master, a node, a domain management device, such as a MIB, a network operation or management device, or some combination thereof. Similarly, one or more of the functional portions of the system could be distributed between a modem and an associated computing device/system, and/or in a dedicated test and/or measurement device.

Furthermore, it should be appreciated that the various links 5, including the communications channel(s) connecting the elements can be wired or wireless links or any combination thereof, or any other known or later developed element(s) capable of supplying and/or communicating data to and from the connected elements. The term module as used herein can refer to any known or later developed hardware, software, firmware, or combination thereof, that is capable of performing the functionality associated with that element. The terms determine, calculate, and compute and variations thereof, as used herein are used interchangeable and include any type of methodology, process, technique, mathematical operational or protocol. The terms transceiver and modem are also used interchangeably herein. The terms transmitting modem and transmitting transceiver as well as receiving modem and receiving transceiver are also used interchangeably herein.

The term management interface is related to any type of interface between a management entity and/or technician and a transceiver, such as, a CO-MIB or CPE-MIB as described, for example, in ITU standard G.997.1, which is incorporated herein by reference in its entirety.

Moreover, while some of the exemplary embodiments described herein are directed toward a transmitter portion of a transceiver performing certain functions, this disclosure is intended to include corresponding receiver-side functionality in both the same transceiver and/or another transceiver, and vice versa.

FIG. 1 illustrates an exemplary communications environment 1. The communications environment 1, in addition to well known componentry, includes a plurality of transceivers or endpoints or nodes 100, that are connectable to and capable of exchanging information with one or more other transceivers or endpoints or nodes in one or more other networks, such as out-of-domain network 210, out-of-domain network 220, in-domain (local) network 230, and a local (domain) master 240 via wired or wireless links 5 and network(s) (not shown). The transceiver(s) 100, in addition to well-known componentry, includes a constellation scrambler and LFSR generator module 102, a local LFSR seed management module 110, an out-of-domain LFSR seed management module 120, a cross-correlation module 130, a seed communication module 140, transmitter module 150, receiver module 160, controller/processor 105 and memory 107. The various transceivers or endpoints in the environment 1 are capable of being connected to one or more other transceiver or endpoints by links such as one or more of directly connectable to one or more other transceivers (or networks) as well as indirectly connectable 7 to one or more other transceivers (or networks) through one or more transceivers as illustratively shown by the non-limiting links illustrated in FIG. 1.

As discussed, there are several exemplary techniques for communicating an out-of-domain seed to, for example, a receiver portion that includes receiver module 160 of transceiver 100.

In accordance with the first exemplary embodiment, the seed can be indicated in of the header portion and/or data portion of a packet. For example, a transceiver having a seed communication module can assemble a packet where the header portion of the packet could contain one or more bit fields that contain information that can be used to determine the value of the LFSR seed used for the preamble portion of the packet. For example, the transceiver could be a transceiver in the local network 5 or the transceiver could be a transceiver in the neighboring network 220 (out-of-domain).

When the packet is received, the receiver portion of transceiver 100 could learn the out-of-domain seed after decoding the information contained in the header portion of the packet. After learning the out-of-domain seed, which is managed and can be stored by the out-of-domain LFSR seed management module 120, the receiver portion of transceiver 100 could cooperate with the seed communication module 140 such that the transceiver 100 could send a packet indicating the value of the determined out-of-domain seed to, for example, the local master 240. The local master 240 could then transmit the value of out-of-domain seed in the header portion and/or data portion of a local MAP frame as discussed in greater detail hereinafter, to one or more other transceivers in the in-domain (local) network 230.

In accordance with another exemplary embodiment, a seed can be indicated in a header portion and/or data portion of an out-of-domain MAP frame. For example, the header portion and/or data portion of the out-of-domain MAP frame could contain one or more bit fields that contain information that can be used to determine the value of the LFSR seed used for the preamble portion of the packets sent in the neighboring (out-of-domain) network. The receiver would learn the out-of-domain seed after receiving an out-of-domain MAP frame and decoding the header portion and/or data portion of the MAP frame. After receiving the out-of-domain MAP frame, the transceiver 100 could notify one or more of the local master 240 and/or other endpoints and/or nodes and/or transceivers within the in-domain network 230 of the out-of-domain seed.

In accordance with one exemplary embodiment, this is done by utilizing a local MAP frame, where the transceiver assembles a local MAP frame with bit field(s) that contain information that can be used to determine the value of one or more out-of-domain LFSR seeds that were used for a preamble portion of packets from one or more other domains.

In accordance with another exemplary embodiment, one or more out-of-domain seeds can be indicated in a header portion and/or data portion of a local MAP frame. For example, upon receipt of a local MAP frame by the transceiver 100, the header portion of the MAP frame could contain one or more bit fields that contain information that can be used to determine the value of one more out-of-domain LFSR seeds used for the preamble portion of packets from one or more other domains. These out-of-domain LFSR seeds can be stored and/or managed by the out-of-domain LFSR seed management module 120.

In accordance with another exemplary embodiment, the receiver portion of transceiver 100 may receive a plurality of out-of-domain packet(s) in order to determine the LFSR seed used for the preamble portion of the packets. For example, the receiver portion of transceiver 100 may process the out-of-domain packet(s), in cooperation with the cross-correlation module 130, using a plurality of seeds, from one or more of the local LFSR seed management module 110 and the out-of-domain LFSR seed management 120 to determine the seed that is being used by the other domain. This may be done, for example, to a diagnostic mode where the other transceivers in the local network are silent. After learning the out-of-domain seed, the transceiver 100 (cooperating with transmitter module 150) could send a packet indicating the value of the out-of-domain seed to, for example, the local master 240. The local master 240 could then, for example, transmit the value of the out-of-domain seed in a header portion and/or data portion of a local MAP frame to one or more other transceivers in the in-domain network 230.

Figure 2:
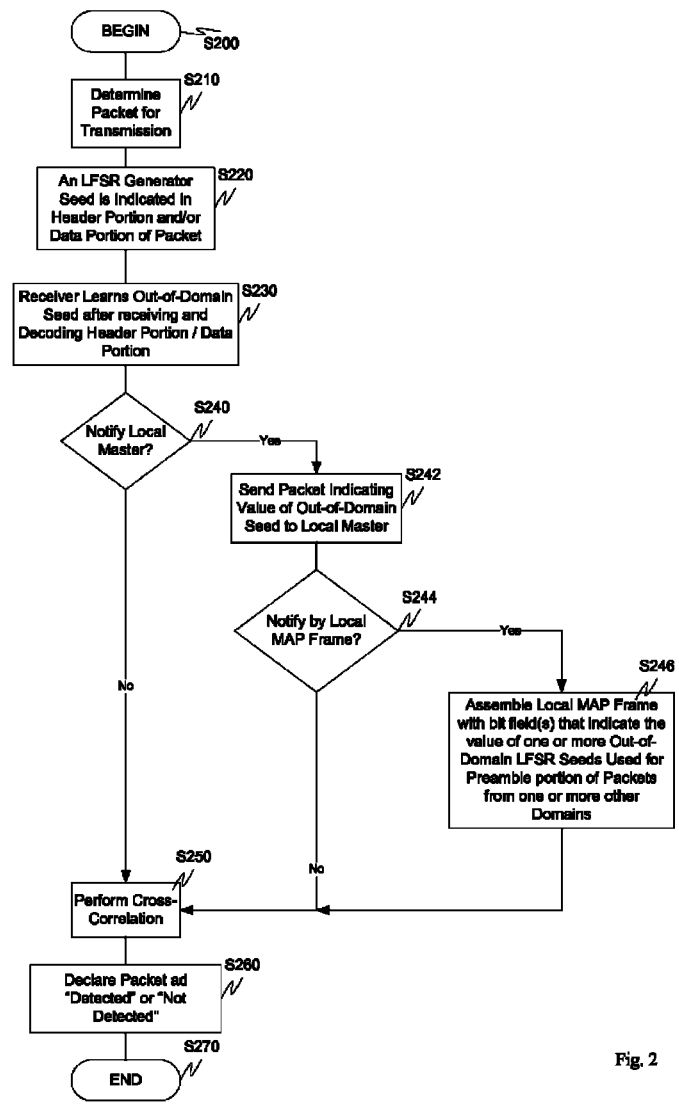
FIG. 2 is a flowchart outlining an exemplary method for improved packet detection.

FIG. 2 is a flowchart outlining an exemplary technique for improving packet detection according to an exemplary embodiment. In particular control begins in step S200 and continues to step S210. In step S210, a transceiver from an out-of-domain network determines a packet for transmission. Next, in step S220, an LFSR generator seed is indicated in one or more of the header portion or data portion of a packet. For example, the header portion of the packet could contain one or more bit fields that contain information that can be used to determine the value of the LFSR seed used for the preamble portion of the packet. Then, in step S230, a receiver learns of the out-of-domain seed after receiving and decoding one or more of the header portion and data portion of the packet. Control then continues to step S240.

In step S240, and after decoding and determining a seed for the out-of-domain packet, a determination is made whether a local master should be notified. If a local master is to be notified, control continues to step S242 with control otherwise jumping to step S250.

In step S242, the recipient of the out-of-domain packet can send a packet indicating the value of the out-of-domain seed to the local master. For example, the header portion and/or data portion of the MAP frame could contain one or more bit fields that contain information that can be used to determine the value of the LFSR seed used for the preamble portion of the packets sent in the neighboring (out-of-domain) network. Next, in step S244, a determination is made whether a notification should be made by a local MAP frame. If the notification is to be made by a local MAP frame, control continues to step S246 with control otherwise jumping to step S250.

In step S246, a local MAP frame is assembled with bit field(s) that indicate the value of one or more out-of-domain LFSR seeds used for the preamble portion of packets from one or more other domains. Control then continues to step S250.

In step S250, one or more cross-correlations can be performed to determine, for example, whether the packet was from a transceiver or endpoint that is from an out-of-domain network, or from an in-domain network. Based on these cross-correlations, packets from the in-domain network are declared as "detected" and packets from outside of the in-domain are declared as "not detected." "Detected" packets are decoded and sent to the upper layer as necessary whereas "not detected" packets can be discarded and not processed further. Control then continues to step S270 where the control sequence ends.

Figure 3:
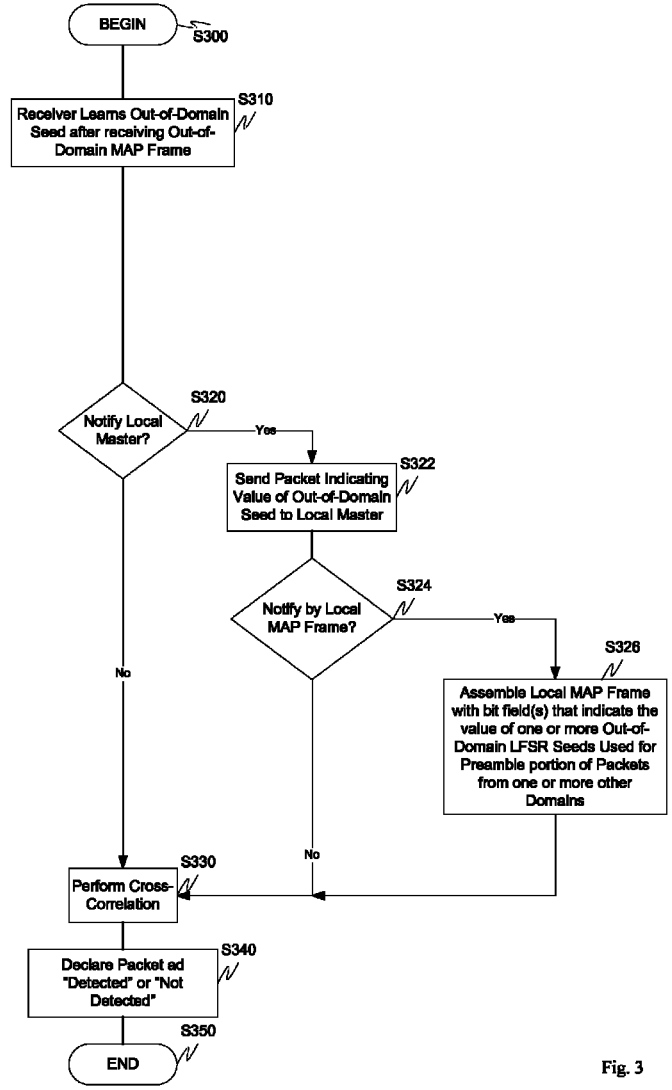
FIG. 3 is a flowchart outlining another exemplary method for improved packet detection.

FIG. 3 is a flowchart outlining another exemplary technique for improving packet detection according to an exemplary embodiment. In particular control begins in step S300 and continues to step S310. In step S310, a transceiver learns an out-of-domain seed after receiving an out-of-domain MAP frame. Next, in step S320, a determination is made whether a local master should be notified. If a local master is to be notified, control continues to step S322 with control otherwise jumping to step S330.

In step S322, the recipient of the MAP frame can send a packet indicating the value of the out-of-domain seed to the local master. Next, in step S324, a determination is made whether a notification should be made by a local MAP frame. If the notification is to be made by a local MAP frame, control continues to step S326 with control otherwise jumping to step S330.

In step S326, a local MAP frame is assembled with bit field(s) that contain information that can be used to determine the value of one or more out-of-domain LFSR seeds used for the preamble portion of packets from one or more other domains. Control then continues to step S330.

In step S330, a cross-correlation can be performed to determine, for example, whether the packet was from a transceiver or endpoint that is from an out-of-domain network, or from an in-domain network. Based on this cross-correlation, packets from the in-domain network are declared as "detected" and packets from outside of the in-domain are declared as "not detected." Control then continues to step S350 where the control sequence ends.

Figure 4:
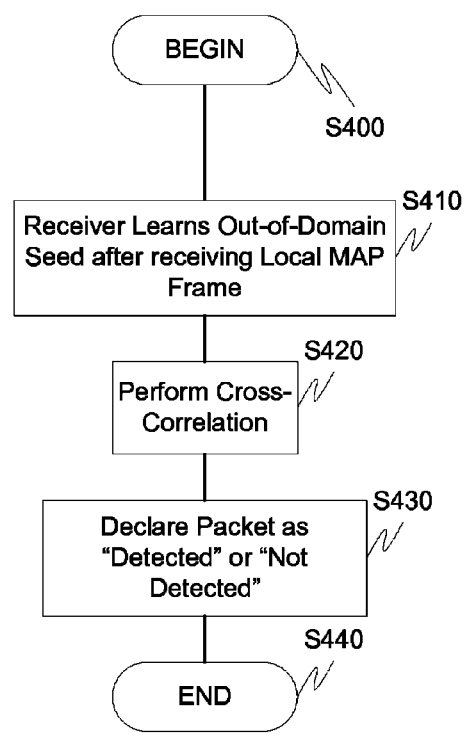
FIG. 4 is a flowchart outlining another exemplary method for improved packet detection.

FIG. 4 illustrates an exemplary technique for learning about a seed form an out-of-domain transceiver according to an exemplary embodiment. In particular, control begins in step S400 and continues to step S410. In step S410, a receiver learns about an out-of-domain seed after receiving a local MAP frame. Next, in step S420, a cross-correlation is performed with, in step S430, packets declared as detected for in-domain network packets and as not detected for out-of-domain packets. Control then continues to step S440 where the control sequence ends.

Figure 5:
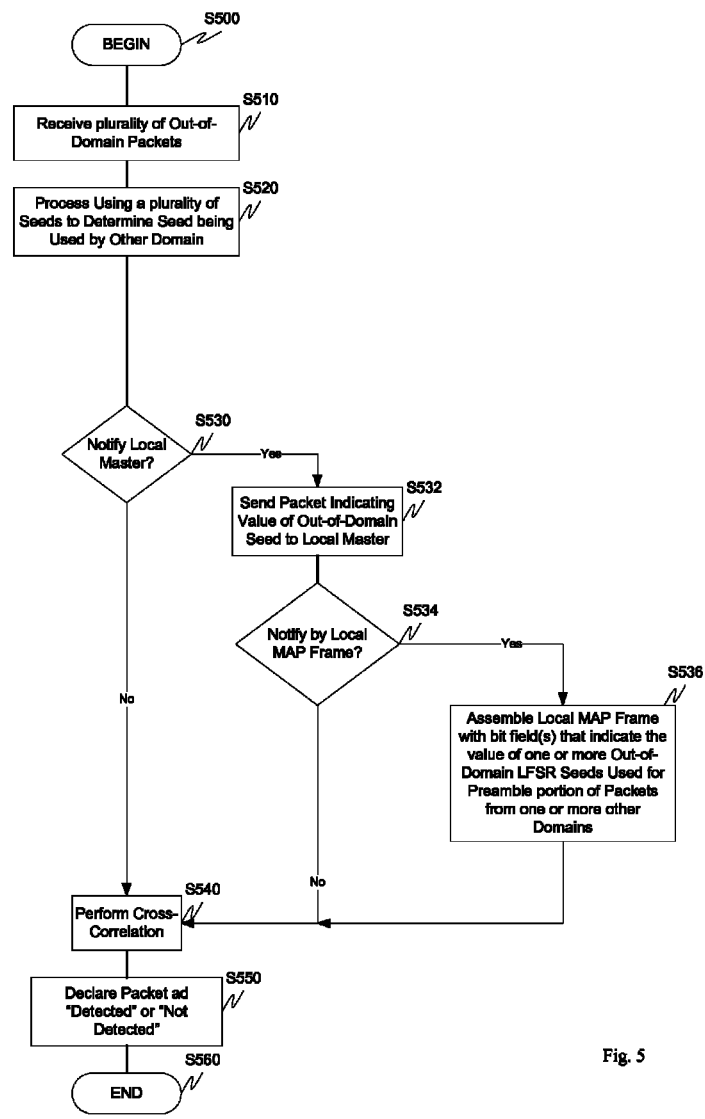
FIG. 5 is a flowchart outlining another exemplary method for improved packet detection.

FIG. 5 is a flowchart outlining another exemplary technique for improving packet detection according to an exemplary embodiment. In particular control begins in step S500 and continues to step S510. In step S210, a plurality of out-of-domain packets are received. Next, in step S520, the plurality of received packets are processed using a plurality of seeds and a comparison made to determine the seed(s) being used by the other domain(s) that sent the packet(s). Then, in step S530, a determination is made whether a local master should be notified. If a local master is to be notified, control continues to step S532 with control otherwise jumping to step S540.

In step S532, the recipient of the out-of-domain packet(s) can send a packet indicating the value of the determined out-of-domain seed to the local master. Next, in step S534, a determination is made whether a notification should be made by using a local MAP frame. If the notification is to be made by a local MAP frame, control continues to step S536 with control otherwise jumping to step S5400.

In step S536, a local MAP frame is assembled with bit field(s) that indicate the value of one or more out-of-domain LFSR seeds used for the preamble portion of packets from one or more other domains. Control then continues to step S540.

In step S540, a cross-correlation can be performed to determine, for example, whether the packet was from a transceiver or endpoint that is from an out-of-domain network, or from an in-domain network. Based on this cross-correlation, packets from the in-domain network are declared as "detected" and packets from outside of the in-domain are declared as "not detected." Control then continues to step S560 where the control sequence ends.

Figure 6:
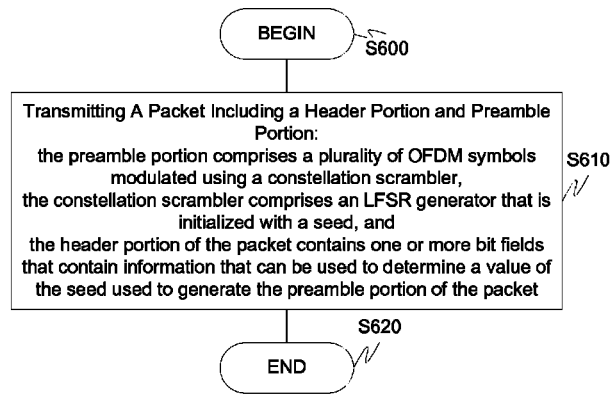
FIG. 6 is a flowchart outlining an exemplary method for transmitting a packet.

FIG. 6 is a flowchart outlining an exemplary method for transmitting a packet. In particular, control begins in step S600 and continues to step S610. In step S610, a transmitter transmits a packet that includes a header portion and preamble portion. The preamble portion includes a plurality of OFDM symbols modulated using a constellation scrambler. The constellation scrambler includes an LFSR generator that is initialized with a seed, where the header portion of the packet contains one or more bit fields that contain information that can be used to determine a value of a seed used for initializing an LFSR generator that was used to generate the preamble portion of the packet. Control then continues to step S620 where the control sequence ends.

Figure 7:
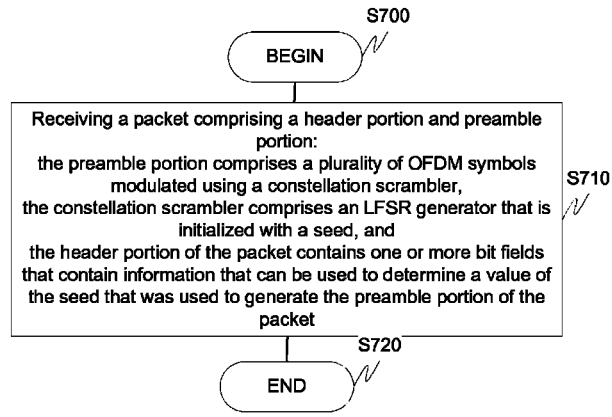
FIG. 7 is a flowchart outlining an exemplary method of receiving a packet.

FIG. 7 is a flowchart outlining an exemplary method of receiving a packet. In particular, control begins in step S700 and continues to step S710. In step S710, a receiver receives a packet that includes a header portion and preamble portion. The preamble portion includes a plurality of OFDM symbols that were modulated using a constellation scrambler. The constellation scrambler used an LFSR generator that was initialized with a seed, where the header portion of the packet contains one or more bit fields that contain information that can be used to determine a value of the seed that was used to generate the preamble portion of the packet. Control then continues to step S720 where the control sequence ends.

Figure 8:
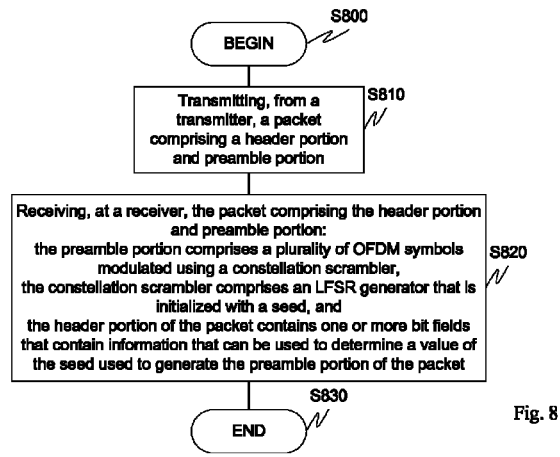
FIG. 8 is a flowchart outlining an exemplary method for a system to transmit and receive a packet.

FIG. 8 is a flowchart outlining an exemplary method for a system to transmit and receive a packet. In particular, control begins in step S800 and continues to step S810. In step S810, a transmitter transmits a packet including a header portion and preamble portion. Next, in step S820, a receiver receives the packet that includes the header portion and preamble portion, where the preamble portion includes a plurality of OFDM symbols modulated using a constellation scrambler, where the constellation scrambler comprises an LFSR generator that is initialized with a seed, and the header portion of the packet contains one or more bit fields that contain information that can be used to determine a value of the seed used to generate the preamble portion of the packet. Control then continues to step S830 where the control sequence ends.

Figure 9:
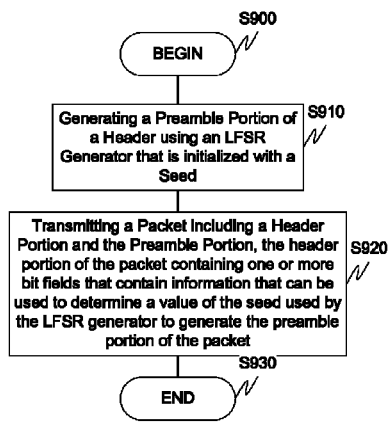
FIG. 9 is a flowchart outlining an exemplary method for generating and transmitting a packet.

FIG. 9 is a flowchart outlining an exemplary method for generating and transmitting a packet. In particular, control begins in step S900 and continues to step S910. In step S910, the preamble portion of the packet is generated using an LFSR generator that is initialized with a seed. Next, in step S920, a packet comprising a header portion and the preamble portion is transmitted, where the header portion of the packet contains one or more bit fields that contain information that can be used to determine a value of the seed used by the LFSR generator to generate the preamble portion of the packet. Control then continues to step S930 where the control sequence ends.

Figure 10:
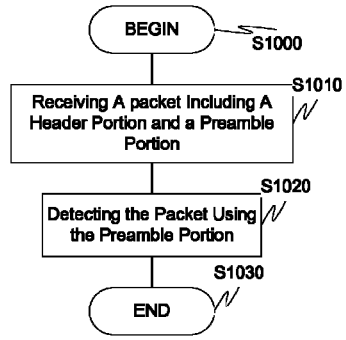
FIG. 10 is a flowchart outlining an exemplary method for receiving a packet.

FIG. 10 is a flowchart outlining an exemplary method for receiving a packet. In particular, control begins in step S1000 and continues to step S1110. In step S1010, a receiver receives a packet that includes a header portion and preamble portion. Next, in step S1020, the packet is detected using the preamble portion, where the preamble portion was generated using an LFSR generator that was initialized with a seed, and wherein the header portion of the packet contains one or more bit fields that contain information that can be used to determine a value of the seed used to generate the preamble portion of the packet. Control then continues to step S1030 where the control sequence ends.

Figure 11:
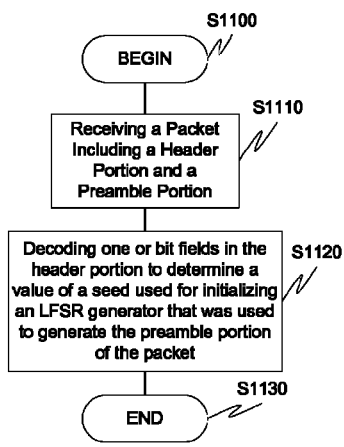
FIG. 11 is a flowchart outlining another exemplary method for receiving a packet.

FIG. 11 is a flowchart outlining another exemplary method for receiving a packet. In particular, control begins in step S1100 and continues to step S1110. In step S1110, a receiver receives a packet that includes a header portion and preamble portion. Next, in step S1120, one or bit fields in the header portion are decoded to determine a value of a seed used for initializing an LFSR generator that was used to generate the preamble portion of the packet. Control then continues to step S1130 where the control sequence ends.

As used herein the terms network and domain have the same meaning and are used interchangeably. Also, the terms receiver, receiving node and receiving transceiver have the same meaning and are used interchangeably. Similarly, the terms transmitter, transmitting node and transmitting transceiver have the same meaning and are used interchangeably. The terms transceiver and modem also have the same meaning and are used interchangeably. While the term home network has been used in this description, the description is not limited to home networks but in fact applies also to any network, such as enterprise networks, business networks, or any network with a plurality of connected nodes. The terms transceiver, node and modem have the same meaning and are used interchangeably in the description. The term frame and packet have the same meaning and are used interchangeably in the description. The term header and PHY-frame header have the same meaning and are used interchangeably in the description.

The terms network and home network have the same meaning and are used interchangeably in the description. While the term Home network has been used in this description, the description is not limited to home networks but in fact applies also to any network, such as enterprise networks, business networks, or any network with a plurality of connected nodes.

While the above-described methods and systems can be described with respect to a port (or endpoint) in a network, they can also be implemented in a dedicated module such as a test or network optimization module. This dedicated module could be plugged into the network and act as a Domain Master or with the cooperation of the Domain Master could initiate the various measurement techniques, gather the measurements from the port(s) in the network, analyze the measurements and use the measured information to detect and diagnose problems in the network and/or to optimize or improve the performance of a network.

The above-described methods and systems and can be implemented in a software module, a software and/or hardware testing module, a telecommunications test device, a DSL modem, an ADSL modem, an xDSL modem, a VDSL modem, a linecard, a G.hn transceiver, a MOCA transceiver, a Homeplug transceiver, a powerline modem, a wired or wireless modem, test equipment, a multicarrier transceiver, a wired and/or wireless wide/local area network system, a satellite communication system, network-based communication systems, such as an IP, Ethernet or ATM system, a modem equipped with diagnostic capabilities, or the like, or on a separate programmed general purpose computer having a communications device or in conjunction with any of the following communications protocols: CDSL, ADSL2, ADSL2+, VDSL1, VDSL2, HDSL, DSL Lite, IDSL, RADSL, SDSL, UDSL, MOCA, G.hn, Homeplug® or the like.

Additionally, the systems, methods and protocols of this invention can be implemented on a special purpose computer, a programmed microprocessor or microcontroller and peripheral integrated circuit element(s), an ASIC or other integrated circuit, a digital signal processor, a flashable device, a hard-wired electronic or logic circuit such as discrete element circuit, a programmable logic device such as PLD, PLA, FPGA, PAL, a modem, a transmitter/receiver, any comparable means, or the like. In general, any device (or one or more equivalent means) capable of implementing a state machine that is in turn capable of implementing the methodology illustrated herein can be used to implement the various communication/measurement methods, protocols and techniques according to this invention.

Furthermore, the disclosed methods may be readily implemented in software stored on a non-transitory computer-readable storage media using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and telecommunications arts.

Moreover, the disclosed methods may be readily implemented in software that can be stored on a computer-readable storage medium, executed on programmed general-purpose computer with the cooperation of a controller and memory, a special purpose computer, a microprocessor, or the like. The systems and methods of this invention can be implemented as a program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a test/modem device.

While the invention is described in terms of exemplary embodiments, it should be appreciated that individual aspects of the invention could be separately claimed and one or more of the features of the various embodiments can be combined.

While the exemplary embodiments illustrated herein discuss the various components collocated, it is to be appreciated that the various components of the system can be located a distant portions of a distributed network, such as a telecommunications network and/or the Internet or within a dedicated communications network. Thus, it should be appreciated that the components of the system can be combined into one or more devices or collocated on a particular node of a distributed network, such as a telecommunications network. As will be appreciated from the following description, and for reasons of computational efficiency, the components of the communications network can be arranged at any location within the distributed network without affecting the operation of the system.

It is therefore apparent that there has been provided, in accordance with the present invention, systems and methods for combining data and probe frames. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

APPENDIX A

Text from G.9960 (G.hn)

7.1.4.5.2.1.1 Modulation of the Preamble Symbol

For the non-masked sub-carriers of the preamble, a bit sequence of all 1's shall be mapped using the 1-bit constellation as specified in §7.1.4.3.1.2. Other bit sequences are for further study.

The LFSR generator shall be initialized at the beginning of each one of the used preamble sections to a seed that is preamble section and medium dependent as defined in §7.2.

The output of the mapper shall be subsequently rotated using the two bits that are the LSBs of the LFSR, s1, and s2, as defined in Table 7-26 (constellation scrambler) resulting in constellation point Z.

The LFSR shall be advanced by 2 bits for each preamble's sub-carrier (either masked or not).

7.1.4.3.3 Constellation Scrambler

Figure 12:
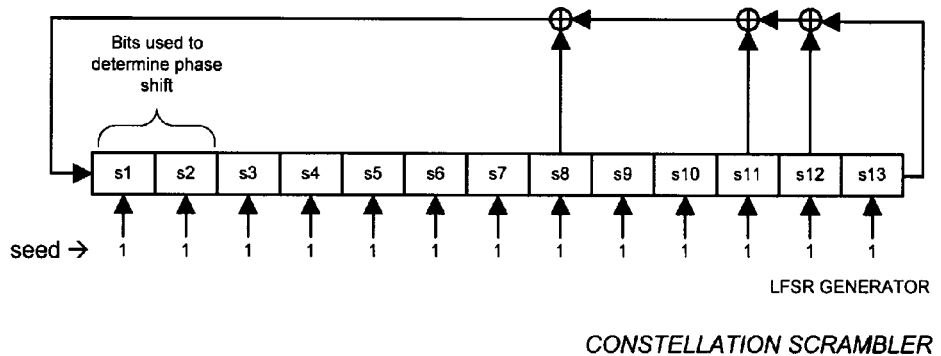
FIG. 12 in Appendix A illustrates a G.9960 Constellation Scrambler.

The phase of constellation points generated by the Constellation Mapper shall be shifted in accordance with the pseudo-random sequence generated by a Linear Feedback Shift Register (LFSR) generator, as shown in FIG. 12.

FIG. 12/G.9960—Constellation Scrambler

The LFSR generator shall implement the polynomial $g(x) = x^{13}+x^{12}+x^{11}+x^{8}+1$ and shall be advanced by 2 bits for each sub-carrier. The two LSB's of the register shall be taken to determine the phase shift as shown in Table 7-26. The shift of the LFSR for subcarrier index k will be 2 k.

TABLE 7

26/G.9960 - Constellation phase shift versus LSFR output

| LFSR OUTPUT | | PHASE SHIFT |
|---|---|---|
| S2 | S1 | (rad) |
| 0 | 0 | 0 |
| 0 | 1 | $\pi/2$ |
| 1 | 0 | $\pi$ |
| 1 | 1 | $3\pi/2$ |

APPENDX B

ITU - Telecommunication Standardization Sector
STUDY GROUP 15
Baltimore, Maryland - 22-26 Jun. 2009
Question: 4/15
SOURCE[1]: CopperGate Communications
TITLE: G.hn: Supporting multiple reference sequences to modulate the preamble Temporary Document
09BM-038
Original: English

ABSTRACT

This paper proposes to allow different reference sequences to modulate the preamble subcarriers. The different sequences may be defined by a properly chosen set of seeds that initialize the already specified LFSR generator. This LFSR generator provides the pseudo-random di-bit sequence that modulates the non-masked preamble sub-carriers.

Allowing the use of different reference sequences among different networks can serve as another mechanism for mitigating disturbances from neighbouring networks in PLC environments.

1. Introduction

The current G.hn draft specifies the Constellation Scrambler as the LFSR generator that pseudo-randomly modulates the non-masked preamble subcarriers. It is further specified that this LFSR generator shall be initialized at the beginning of each one of the used preamble sections to a seed that is preamble section and medium dependent. We suggest to amend this definition and allow the use of a seed drawn from a TBD set of seeds. This extension will give rise to mechanisms that mitigate the problem of neighbouring G.hn networks.

2. Multiple Seed and Neighbouring Networks

Performance degradation due to cross-talk from neighbouring networks is a key concern in PLC. As the penetration rate for PLC technology increases, the chance for having multiple apartments with PLC installations in the same building also increases.

Considering interference from neighbouring networks, we would like to distinguish between two basic scenarios: high cross-talk and low cross-talk scenario.

High Cross-Talk Scenario

Under this scenario, collision between transmissions from two networks would end up with an erroneous reception. In this case, the only feasible solution is to avoid collisions.

Current approaches for mitigating the neighbouring networks interferences were relating to this scenario. An effort was made to coordinate the networks and the goal was to share the overall network capacity among the various networks (apartments). For the symmetric case where the various networks experience similar physical conditions, the outcome would be a rate degradation by the factor of "N", where N is the number of active networks.

Low Cross-Talk Scenario

The cross-talk level from neighbouring networks is in many cases relatively low. As the SNR in PLC is anyway quite low, and the bandwidth in G.hn is very wide, it is beneficial in many cases to relate to the cross-talk from the neighbouring network as another noise source. In this case, we will not try to coordinate the various networks in the building to avoid collisions.

Instead, we would like to ignore the transmissions from alien networks. With this approach, transmission from one network may step over transmission from another network.

A clear prerequisite for the above approach is to reduce the probability of false detection of key signals like:

G.hn preamble signal

PRS, in use signals

Figure 13:
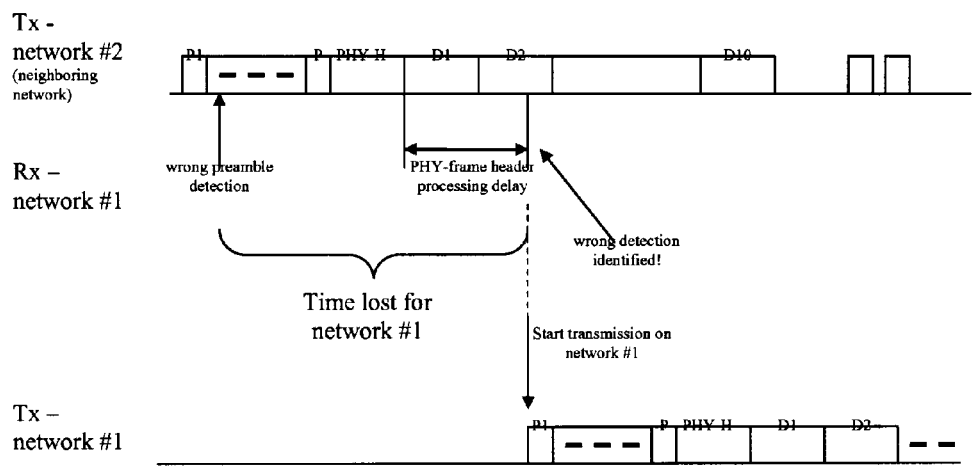
FIG. 13 in Appendix B illustrates loss due to "false" detection of a neighbouring network preamble.

We will now look into a simple example focusing around the preamble detection. Let's assume that all the networks are using the same preamble and that the cross-talk level from neighbouring networks is low. In this case we would like to ignore as much as possible the transmission from other networks. FIG. 13 depicts this scenario. In this figure, network #1 is our network while network #2 in the disturbing neighbouring network.

1 FIG. 13: Loss Due to "False" Detection of a Neighbouring Network Preamble

Rough Evaluation of the Loss Due to a Wrong Preamble Detection

Looking at FIG. 13 we can notice that false preamble detection "blinds" the receiver for a time period comprising of the following elements:

Preamble length, minus the time period for preamble detection. The detection time is relatively short so this period can be roughly approximated to 1 OFDM symbol.

PHY-frame header—one symbol

Processing of the PHY-frame header, i.e., FFT, frequency domain processing, decoding and parsing. This may last 1-2 symbols.

Summarizing the different elements we end up with a dead period of 3-4 symbols where the receiver is "blind". The exact numbers depend on the exact implementation details.

The resulting loss is about 3-4 symbols out of every transmission cycle (on average). Let's assume for example an average packet length of 10 data symbols (approximately 0.7 msec including preamble, FC and IFG). In this example, the loss would be in the range of 20-30%. A more detailed analysis can be made, taking into account the full transmission cycle including the ACK and PRS signals. The result is still similar to the above results.

It should be noted that this example assumes a single neighbour!

3. What Has to be Done in G.hn

The current approach in G.hn is that all G.hn devices share the same parameters—all preambles, PRS, and in-use signals are identical. As a consequence, one network is likely to detect transmissions from other networks, even if its cross-talk level is low and should not cause a significant capacity loss.

To improve our immunity to cross-talk created by neighbouring networks we suggest to build a mechanism where each network will use different signals for its key sections: preamble, PRS, and in use signals. The ground for implementing this mechanism is already in place.

The preamble signal is already defined based on an LFSR, initiated with a TBD seed. The extra step we need to take is to define that various networks may use different seeds. Key elements in a complete solution:

Dynamic seed selection. Each domain master shall independently select a seed for its network.

Additional MAP fields for communicating the networks' seed to the nodes. Specifically, we suggest to use the Auxiliary Information Filed in the MAP in order to indicate the index of the seed chosen.

Seeds bank. Each domain master shall pick its seed from the predefined seeds bank.

The seed bank shall be defined such that the selected seeds generate pseudo-random sequences (and derived sequences) which are close to being orthogonal.

Default seed for all MAP messages. A single predefined MAP seed will be common for all networks.

This contribution starts with the first two steps by suggesting to accept dynamic seeds selection as a means for mitigating cross-talk from neighbouring networks. We also suggest the required additions to the MAP structure needed to support this function. The specific seed values are left for further study.

4. Proposal

<<<Start of Text>>>

7.1.4.5.2.1.1 Modulation of the Preamble Symbol

The non-masked preamble's sub-carriers shall be modulated using a default reference BPSK sequence, of all 1's. Other reference sequences are for further study. The reference sequence shall be subsequently rotated as specified in §7.1.4.3.3 (Constellation scrambler).

The LFSR generator shall be initialized at the beginning of each one of the used preamble sections to a seed as selected by the MAP message from a TBD seed set, that is preamble section and medium dependent as defined in §7.2.

For non-masked preamble's sub-carrier i, Zi shall be generated by rotating Pi using the two bits that are the LSBs of the LFSR, s1, and s2, as defined in Table 7-26.

The LFSR shall be advanced by 2 bits for each preamble's sub-carrier (either masked or not).

<<<End of Text>>>
<<<Start of Text>>>

TABLE 8

45/G.hn - Type of auxiliary information

| Type | Value | Description |
| --- | --- | --- |
| Auxiliary information indicator | $00_{16}$ | A 1-octet field indicating no valid data in the auxiliary information field |
| Domain name | $01_{16}$ | A 32-octet field indicating domain name represented in ASCII characters |
| PSM hibernation schedule | $02_{16}$ | A variable-length field indicating future scheduled hibernation periods for a node(s) in low-power mode and idle mode, as described in §8.8.3.1.3. |
| Selected seed for preamble modulation | $03_{16}$ | A single octet field indicating the index of the seed selected to initialize the LFSR for preamble generation, as described in §7.1.4.5.2.1.1 |
| Reserved | $04_{16}$-$FF_{16}$ | Reserved by ITU-T |

<<<End of Text>>>

5. References

[1] G.hn 09GS-R12R3 "G.hn: Draft text for G.hn—version 3.3R2", Editor for G.hn, Geneva, Switzerland, 11-15 May 2009.

6. Summary

It is proposed to agree on the following new items

| | | | |
| --- | --- | --- | --- |
| 5.0.1.2.2.48 | Open | Should the text for §7.1.4.5.2.1.1 "Modulation of the preamble symbol" shall be revised according to 09BM-038 (Section 4)? | 09BM-038 |
| 6.6.29 | Open | Should the text for 8.8.3.1 "Auxiliary information" shall be revised according to 09BM-038 (Section 4)? | 09BM-038 |
| 6.6.30 | Open | Shall G.hn define a mechanism for facilitating each domain master to select its own seed for the preamble reference signal? | 09BM-038 |

What is claimed is:
The invention claimed is:

1. A method of OFDM communication comprising:
transmitting, by a transmitter, a packet including a header portion and preamble portion,
wherein:
the preamble portion includes a plurality of OFDM symbols modulated using a constellation scrambler,
the constellation scrambler includes an LFSR generator that is initialized with a seed,
the header portion of the packet contains one or more bit fields that contain information that can be used to determine a value of the seed used to generate the preamble portion of the packet, and
the value of the seed is used to determine whether the packet is an out-of-domain packet or an in-domain packet.

2. A non-transitory computer readable information storage media including instructions, that if executed by a processor, cause to be performed the steps in claim 1.

3. The method of claim 1, wherein the transmitter includes an ASIC.

4. The method of claim 1, wherein the transmitter includes a digital signal processor.

5. The method of claim 1, further comprising performing, in a receiver, one or more cross-correlations to determine whether the packet was from a transceiver or endpoint that is from an out-of-domain network or from an in-domain network.

6. The method of claim 1, further comprising learning, in a receiver, an out-of-domain seed after receiving a first out-of-domain packet and decoding the header portion of that packet, and after learning the out-of-domain seed, the receiver sends a packet indicating the value of the out-of-domain seed to a local master.

7. A system for OFDM communication comprising:
means for transmitting a packet including a header portion and preamble portion,
wherein:
the preamble portion includes a plurality of OFDM symbols modulated using a constellation scrambler,
the constellation scrambler includes an LFSR generator that is initialized with a seed, and
the header portion of the packet contains one or more bit fields that contain information that can be used to determine a value of the seed used to generate the preamble portion of the packet, and
the value of the seed is used to determine whether the packet is an out-of-domain packet or an in-domain packet.

8. The system of claim 7, wherein the means for transmitting includes an ASIC.

9. The system of claim 7, wherein the means for transmitting includes a digital signal processor.

10. The method of claim 7, further comprising means for performing, in a receiver, one or more cross-correlations to determine whether the packet was from a transceiver or endpoint that is from an out-of-domain network or from an in-domain network.

11. The method of claim 7, further comprising means for learning, in a receiver, an out-of-domain seed after receiving a first out-of-domain packet and means for decoding the header portion of that packet, and after learning the out-of-domain seed, the receiver sends a packet indicating the value of the out-of-domain seed to a local master.

12. A system for OFDM communication comprising:
a transmitter capable of transmitting a packet including a header portion and preamble portion,
wherein:
the preamble portion includes a plurality of OFDM symbols modulated using a constellation scrambler,
the constellation scrambler includes an LFSR generator that is initialized with a seed, and
the header portion of the packet contains one or more bit fields that contain information that can be used to determine a value of the seed used to generate the preamble portion of the packet, and
the value of the seed is used to determine whether the packet is an out-of-domain packet or an in-domain packet.

13. The system of claim 12, wherein the transmitter includes an ASIC.

14. The system of claim 12, wherein the transmitter includes a digital signal processor.

15. The method of claim 12, further comprising a receiver capable of performing one or more cross-correlations to determine whether the packet was from a transceiver or endpoint that is from an out-of-domain network or from an in-domain network.

16. The method of claim 12, further comprising a receiver capable of learning an out-of-domain seed after receiving a first out-of-domain packet and decoding the header portion of that packet, and after learning the out-of-domain seed, the receiver sending a packet indicating the value of the out-of-domain seed to a local master.

* * * * *